United States Patent [19]
Lang et al.

[11] Patent Number: 6,067,850
[45] Date of Patent: May 30, 2000

[54] FAST AND ACCURATE TIRE PRESSURE CHARGE CONTROLLER

[76] Inventors: Yu Lang; Xiaojian Tao, both of Tranquil Park Dr., San Antonio, Tex. 78250

[21] Appl. No.: 08/890,493

[22] Filed: Jul. 9, 1997

[51] Int. Cl.$^7$ ................................................. B06C 23/00
[52] U.S. Cl. ........................... 73/146.8; 702/140; 152/415
[58] Field of Search ................................ 73/146.2, 146.5, 73/146.8; 152/415; 702/140; 340/442

[56] References Cited

U.S. PATENT DOCUMENTS

| | | | |
|---|---|---|---|
| 4,333,491 | 6/1982 | Knubley | 73/146.8 X |
| 4,694,409 | 9/1987 | Lehman | 73/146.8 X |
| 4,875,509 | 10/1989 | Da Silva | 73/146.2 X |
| 5,180,456 | 1/1993 | Schultz et al. | 73/146.5 X |
| 5,249,609 | 10/1993 | Walker et al. | 73/146.2 |
| 5,429,166 | 7/1995 | Anzai et al. | 152/415 |

*Primary Examiner*—George M. Dombroski
*Assistant Examiner*—Paul D. Amrozowicz

[57] ABSTRACT

A fast and accurate pressure charge controller to inflate a tire or a pressure container to a desired pressure with an air or a gas compressor supplied pressure without regulation of the supplied pressure and without using a pressure gauge or any hand-held pressure measurement device to measure the charged pressure at the vicinity of the tire or the container, to stop charging and to send out either an audio or a visual signal when desired tire or the container's pressure is reached. The controller is also able to release over charged tires or pressure containers to desired pressure.

1 Claim, 2 Drawing Sheets

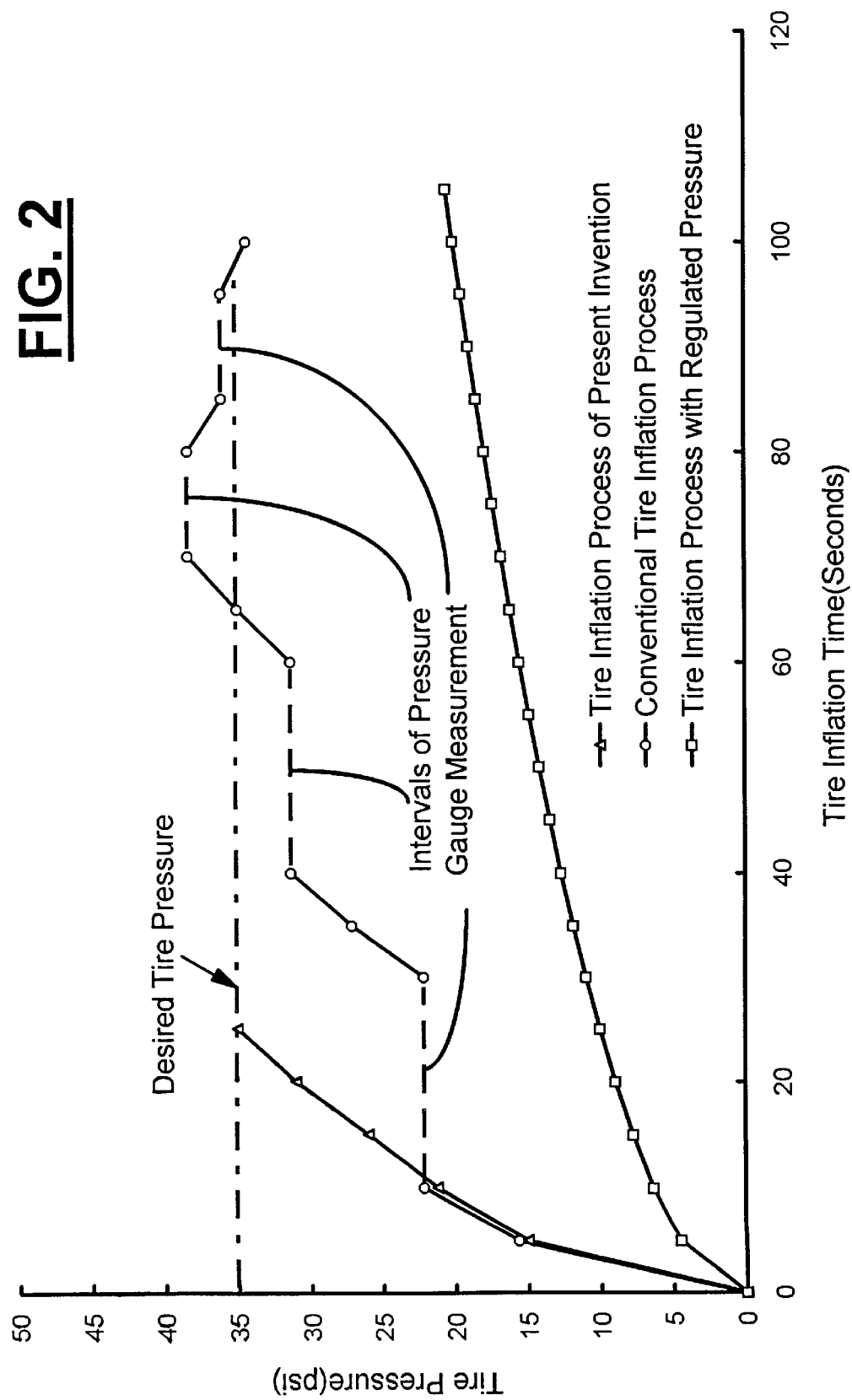

FAST AND ACCURATE TIRE PRESSURE CHARGE CONTROLLER

FIELD OF THE INVENTION

The present invention relates to a pressure supply source that deals with tires of a vehicle or pressure containers that need to be fast and accurately charged to a desired pressure value.

BACKGROUND OF THE INVENTION

Vehicle tire pressure plays a very important part in tire service life and in vehicle fuel economy. Either over pressure or under pressure of a tire will significantly reduce tire service life. And under pressured tires often result in reduced vehicle fuel economy. A conventional way to achieve a proper tire pressure charge is to utilize an air pressure source and a tire pressure measurement device, charging the tire for a while and then making a measurement, and then charging and making measurement. Repeating this procedure many times to achieve the desired tire pressure. Another way to achieve proper tire pressure charge is to regulate down the supply air pressure source to the desired pressure and then to charge the tire with the regulated pressure. Since there is no significant pressure head for the pressure charge, this approach takes much longer time to achieve a desired tire pressure than that of the conventional way does. Due to these particular reasons that neither of these approaches of pressure inflation are very convenient, vehicle drivers perform tire pressure check much less often than necessary. In the past decades, many inventors have tried to make improvements such as those U.S. Patents cited here: U.S. Pat. No. 2,168,145 by Willis, dated August 1939, U.S. Pat. No. 2,800,795, by Trinca, dated July 1957; U.S. Pat. No. 4,581,925, by Crutcher, dated April 1986; U.S. Pat. No. 4,953,395, by Jard, dated September, 1990; U.S. Pat. No. 4,966,034, by Bock et al, dated October, 1990; and U.S. Pat. No. 5,054,511, by Tuan, et al, dated October, 1991. These patents focused their improvement either on tire or on vehicle by providing a new tire valve or engineering a mechanism inside the tire to indicate and regulate tire pressure. By doing so, it requires to change the current tire industry infrastructure.

The present invention, however, aiming at the pressure supply source, such as the air supply of a gasoline station, enables a fast charge speed with the pressure of the air supply source to charge a tire or a pressure container to a desired pressure without using a hand-held pressure measurement device to measure the tire or the container's pressure.

SUMMARY OF INVENTION

The primary object of the present invention is to provide a fast and accurate pressure charge controller to inflate a tire or a pressure container to a desired pressure with an air or a gas compressor supplied pressure without regulation of the supplied pressure and without using a pressure gauge or any hand-held pressure measurement device to measure the charged pressure at the vicinity of the tire or the container, to stop charging and to send out either an audio or a visual signal when desired tire or container pressure is reached.

Another object of the present invention is to provide a simple connection between a pressure supply source and the controller, a pressure inlet port to the controller, and an outlet port from the controller to a commercially available pressure hose.

Another object of the invention is to provide a user of the controller with a keypad either on the controller or in the user's vehicle to select standard tire pressure settings or to set a specific tire pressure. As soon as the inflation activity is finished, the controller will reset the pressure settings to zero.

Another object of the invention is to provide a scheme of artificial intelligence from the controller to the pressure hose in such a way that, even if the desired pressure setting is specified by executing the above object, the pressure charging activity shall not begin unless the hose head is properly connected to a tire or a pressure container.

Another object of the invention is to provide a scheme of artificial intelligence to shutoff the pressure source through the controller when the pneumatic hose head is broke off for some reason to prevent energy wasting. And the controller shall resume its normal functions as described in the previous objects when the hose head is reinstalled.

Another object of the invention is to provide means to quickly release excessive pressure if a tire or a pressure container has higher pressure than its desired setting.

Further objects and advantages of this invention will become apparent from a consideration of the drawings and ensuing descriptions thereof.

BRIEF DESCRIPTION OF DRAWINGS

FIG. 2 shows an example of tire pressure development comparison between the present invention and two conventionally used methods during the pressure charge process.

Figure 1:
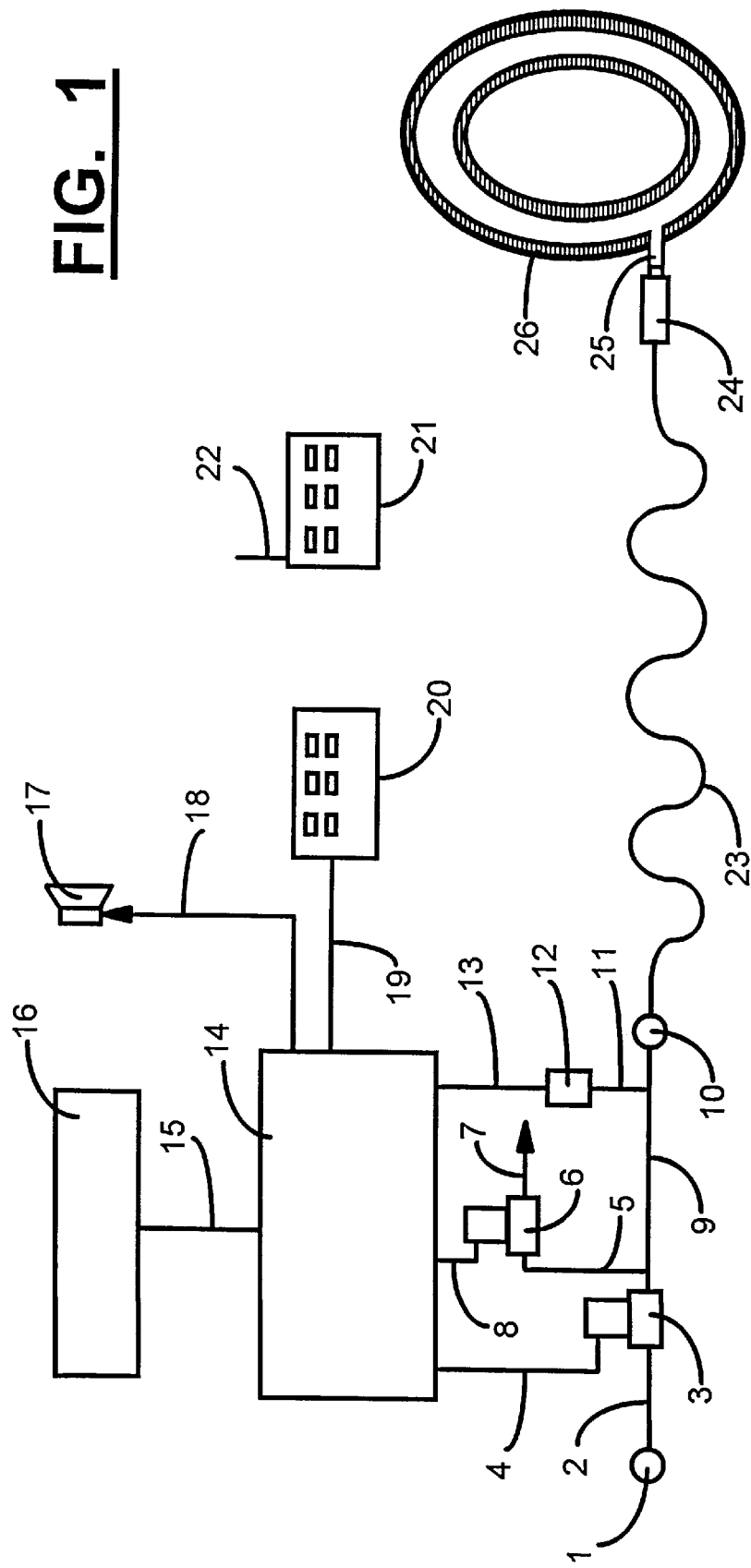
FIG. 1 is a schematic diagram which depicts the implementations of the present invention.

The aforementioned object, and other objects and advantages of the present invention will appear more clearly from this drawing and the following detailed description of the preferred embodiment.

DETAILED DESCRIPTION OF THE PREFERRED EMBODIMENT

In its preferred embodiment, the present invention, referring to FIG. 1, contemplates a microprocessor controlled pneumatic valve system to ensure fast charge or release of a tire or a pressure container to a desired pressure through a pressure hose without utilizing a pressure gauge to measure the pressure at the tire stem or at the container's inlet port. The desired pressure can be selected or set either by using a keypad on the controller or by using a remote keypad transmitter.

Referring now to the drawing in detail, in the graph of FIG. 1, the unit as a whole is referred to as "the controller", and all the other components showing in the graph are referred to as they occur by their individual names and corresponding numbers. The air pressure supply source is connected to the controller pressure inlet port (1). Port (1) is connected to the inlet end of a ON/OFF solenoid valve (3) through an air passage (2). Solenoid valve (3) is electrically connected to a microprocessor (14) through electrical cable (4). The outlet of solenoid valve (3) is connected to an air passage (9), which is also inter-connected to an air passage (5), an air passage (11) in a manifold form and then connected to an outlet port (10) of the controller. The other end of air passage (5) is connected to the inlet end of another ON/OFF solenoid valve (6). The outlet end of solenoid (6) is connected to atmosphere or a pressure return tank through an air passage (7). Solenoid valve (6) is also electrically connected to microprocessor (14) through electrical cable (8). The other end of air passage (11) is connected to an acoustic emission/pressure transducer (12). Transducer (12) is electronically connected to microprocessor (14) through transducer cable (13). Visual display (16) is able to communicate with microprocessor (14) through cable (15). A audible device (17) is able to communicate with microprocessor (14) through cable (18). A on-board keypad (20) can communicate with microprocessor (14) through communication cable (19). And a remote keypad (21) with or without its own display can also communicate with microprocessor (14) though its antenna (22) and a embedded wireless receiver in the microprocessor. Outlet port (10) of the controller is connected to one end of pressure hose (23). The other end of hose (23) is connected to a typical pressure charge head (24). (25) is the tire valve stem or the inlet stem, through which a tire (26) or a pressure container can be charged.

In the preferred embodiment of the present invention, the controller has two basic working modes: a) waiting mode and b) action mode. In waiting mode, microprocessor (14) automatically reset the desired pressure to zero. The action mode consists of two sub-modes: charge mode and discharge mode. these modes shall be described in detail in the following.

In normal operation condition, if there is no desired charge pressure command given by keypad (20) or keypad (21), the controller is in waiting mode and solenoid valves (3) and (6) are shutoff. When a desired charge pressure, $p_d$, is specified either by keypad (20) or keypad (21), microprocessor (14) will immediately process the desired pressure signal and get the controller ready to action mode. Under this mode, the user of the controller holds hose charge head (24) and connects the head to tire valve stem (25). The connecting process will generate certain acoustic emission signature of a random pattern which is transmitted through the pressure hose (23) at sound speed to transducer (12) through passage (11) and then to microprocessor (14) through cable (13). While the signature is being processed, microprocessor (14) will not send any command out as long as hose head (24) has not complete its connection with tire valve stem (25). Once the proper connection between hose head and tire valve stem has been made, the signature of the acoustic emission from the connection, passing through hose (23), air passage (9) and (11) to transducer (12) and to microprocessor (14) through cable (13), shall change from a random pattern to a stable pattern. The signature of stable pattern is then processed by microprocessor (14) in a small fraction of a second to obtain the tire current pressure value, $p_0$. This obtained pressure value is then quickly compared with the earlier specified desired tire pressure value, $p_d$. Based on whether the tire pressure is higher or lower than the specified desire pressure, microprocessor (14) will then get into one of the sub-modes, the charge mode or the discharge mode.

If the pressure of tire (26) is lower than the specified value, microprocessor (14) will get into charge mode. In this mode, microprocessor (14) will issue a command to open solenoid valve (3) through electrical cable (4). Upon receiving the opening command, solenoid valve (3) opens immediately, and compressed air with its supply pressure, $p_s$, passing through valve (3), passage (9), port (10), pressure hose (23), charge head (24), and valve stem (25), charges tire (26) without any pressure regulation. Initially, microprocessor (14) allows this charge going for a time interval, $\Delta T_i$, which is a small time interval within the range of a few seconds. During this small time interval microprocessor (14) also obtains supply pressure, $p_s$, through transducer (12) and at the end of this time interval, microprocessor (14) shall issue a command to shutoff valve (3) for a fraction of a second to allow transducer (12) to obtain a signature of stable pattern and to further obtain the current tire pressure value pi . Microprocessor will calculate the pressure difference $\Delta p_i (=p_i-p_0)$ immediately. Based on these obtained data, microprocessor (14) performs necessary calculation to obtain a dynamic charge formula $$T_d = 2\frac{\Delta T_i}{\Delta p_i}\left((p_s - p_0)^{\frac{1}{2}} - (p_s - p_d)^{\frac{1}{2}}\right)(p_s - p_i)^{\frac{1}{2}}, \text{ where}$$

$T_d$ is the time required to charge the tire to the desired pressure,
$\Delta T_i$ is the initial charge time interval,
$\Delta p_i$ is the tire pressure difference between the tire pressure after initial charge and the tire pressure before charge begins,
$p_s$ is the pressure source supply pressure,
$p_0$ is the initial tire pressure before charge begins,
$p_i$ is the initial tire pressure after the tire has been charged for the initial time interval,
and $P_d$ is the desired tire pressure value.

Microprocessor (14) shall use the above formula to calculate the required charge time, $T_d$, and right after the short shutoff time interval, $\Delta T_i$, issues another command to open solenoid valve (3) to continue to charge tire (26) for an extended time period of $T_d-\Delta T_i$. This time interval, $T_d-\Delta T_i$, in general, is much longer than the initial time interval, $\Delta T_i$. At the end of the charge time interval, $T_d-\Delta T_i$, microprocessor (14) shall issue a command to shutoff solenoid valve (3) again for a fraction of a second to let transducer (12) to obtain stable acoustic emission and tire pressure. If the pressure difference between the tire pressure and the desired pressure is very small and meets the controller originally designed tolerance, for example, 0.5% of the desired pressure, microprocessor (14) will change its charge mode to waiting mode and send the final pressure to display (16) and (21) and also send out certain audio signal to audio device (17) through cable (18) and let the user to know that his charge activity is accomplished and he can let go the charge head. However, If the pressure difference between the tire pressure and the desired pressure does not meet the controller originally designed tolerance, microprocessor (14) shall repeat the above described procedure. Depend on the tire or the pressure container's property and the supply air pressure stability, the procedure will repeat between one to three times, and the tolerance shall be met. Once the tolerance is met, microprocessor (14) will change its charge mode to waiting mode and send the final pressure to display (16) and (21) and also send out certain audio signal to audio device (17) through cable (18) and let the user to know that his charge activity is accomplished and he can let go the charge head. An example of the pressure charge process of the present invention in comparison with that of a conventional pressure charge process and that of a regulated pressure charge process is presented in the graph of FIG. 2.

On the other hand, if the pressure of tire (26) is higher than the specified value, microprocessor (14) will get into discharge mode. In this mode, microprocessor (14) will issue a command to open solenoid valve (6) through electrical cable (8). Upon receiving the opening command, solenoid valve (6) opens immediately, and the tire pressure, passing through valve stem (25), charge head (24), pressure hose (23), port (10), passage (11), valve (12), and passage (7), gets discharged. Microprocessor (14) allows this discharge going for a time interval, $\Delta T_i$, which is a small time interval within the range of one to two seconds. At the end of this time interval, microprocessor (14) shall issue a command to shutoff valve (6) for a fraction of a second to allow transducer (12) to obtain a signature of stable pattern and to further obtain the current tire pressure value pi. Microprocessor will calculate the pressure difference $\Delta p_i (= p_i - p_0)$ immediately. Based on these obtained data, microprocessor (14) performs necessary calculation to obtain a dynamic discharge formula $$T_d = -2 \frac{\Delta T_i}{\Delta p_i} \left( (p_0 - p_a)^{\frac{1}{2}} - (p_d - p_a)^{\frac{1}{2}} \right) (p_i - p_a)^{\frac{1}{2}}, \text{ where}$$

$T_d$ is the time required to discharge the tire to the desired pressure,
$\Delta T_i$ is the initial discharge time interval,
$\Delta p_i$ is the pressure difference between the tire pressure after initial discharge and the tire pressure before discharge begins,
$p_a$ is the atmosphere or the discharge return tank pressure,
$p_0$ is the initial tire pressure before discharge begins,
$p_i$ is the initial tire pressure after the tire has been discharged for the initial time interval,
and $P_d$ is the desired tire pressure value.
Microprocessor (14) shall use the above equation to calculate the required discharge time, $T_d$, and right after the short shutoff time interval, $\Delta T_i$, issues another command to open solenoid valve (6) to continue to discharge tire (26) for an extended time period of $T_d - \Delta T_i$. This time interval, $T_d - \Delta T_i$, in general, is longer than the initial time interval, $\Delta T_i$. At the end of the discharge time interval, $T_d - \Delta T_i$, microprocessor (14) shall issue a command to shutoff solenoid valve (6) again for a fraction of a second to let transducer (12) to obtain stable acoustic emission and tire pressure. If the pressure difference between the tire pressure and the desired pressure is very small and meets the controller originally designed tolerance, for example, 0.5% of the desired pressure, microprocessor (14) will change its discharge mode to waiting mode and send the final pressure to display (16) and (21) and also send out certain audio signal to audio device (17) through cable (18) and let the user to know that his discharge activity is accomplished and he can let go the pressure hose head. However, If the pressure difference between the tire pressure and the desired pressure does not meet the controller originally designed tolerance, microprocessor (14) shall repeat the above described procedure. Depend on the tire or the pressure container's property, the procedure will repeat between one to three times, and the tolerance shall be met. Once the tolerance is met, microprocessor (14) will change its discharge mode to waiting mode and send the final pressure to display (16) and (21) and also send out certain audio signal to audio device (17) through cable (18) and let the user to know that his discharge activity is accomplished and he can let go the pressure hose head.

While the above descriptions contain many specificities, these specificities should not be construed as limitations on the scope of the present invention, but rather as an exemplification of one preferred embodiment thereof. Many variations, in fact, are possible, for example:

the controller may have single inlet port (1), but multiple independent outlet ports (10);
the controller may be incorporated in a pressure supply unit as a integrated part of the said unit;
the desired charge pressure may be entered, not by keypads (20) and (21), but by a plastic card with memory tape or bar code, or by vice activation;
for those vehicle tires which have already equipped with on-board electronic real-time tire pressure measurement device, tire pressure may be transmitted to the controller by a wireless transmitter;
In addition to air, the controller of the present invention may also be used for liquid and gases where it is applicable.

While the present invention has been described in detail with reference to the embodiment specified in the graph of FIG. 1 and its tire charge pressure characteristic in comparison with that of the conventional pressure charge and regulated pressure charge has been shown in the graph of FIG. 2, various modification within the scope of the present invention will be recognized by ordinary skilled artisans. Accordingly, the present invention should be considered as limited only by the appended claims and their legal equivalents, which follow immediately.

We claim:

1. A pressure charge controller comprising:

a supply pressure inlet port for connecting to a pressure source supply;

a flow passage having a first end and a second end;

a microprocessor;

a first valve having an inlet end and an outlet end and being in electrical communication with the microprocessor;

means for connecting the pressure inlet port to the first end of the flow passage;

means for connecting the second end of the flow passage to the inlet end of the first valve;

a flow passage manifold having many interconnected ports;

a second valve having an inlet end and an outlet end and being in electrical communication with the microprocessor;

a pressure transducer being in electrical communication with the microprocessor and having a pressure port for attaching to the flow passage manifold;

a pressure outlet port having two ends;

a hose having a first end and a second end attached to a pressure charge head;

means for connecting the flow passage manifold to the outlet end of the first valve, to the inlet end of the second valve, to the pressure port of the pressure transducer, and to an end of the pressure outlet port;

means for attaching the first end of the hose to the other end of the pressure outlet port;

an independent flow passage having a first end and a second end;

means for connecting the first end of the independent flow passage to the outlet end of the second valve and means for attaching the second end of the independent flow passage to atmospheric pressure or a discharge return tank pressure;

means for specifying or selecting a desired tire or pressure container pressure value;

an audio device in communication with the microprocessor offering differing audible signals;

a display in communication with the microprocessor displaying different visual messages;

means for calculating a pressure charge relationship utilizing the following formula $$T_d = 2\frac{\Delta T_i}{\Delta p_i}\left((p_s - p_0)^{\frac{1}{2}} - (p_s - p_d)^{\frac{1}{2}}\right)(p_s - p_i)^{\frac{1}{2}}$$

where, $T_d$ is the time required to charge the tire or pressure container to the desired pressure, $\Delta T_i$ is an initial charge time interval, $p_0$ is the tire or pressure container pressure before initiating a pressure charge;

$\Delta p_i$ is a pressure difference between the tire or pressure container pressure after initiating an initial pressure charge and the tire or pressure container pressure before the pressure charge began, $p_s$ is the pressure source supply pressure, $p_i$ is the tire or pressure container pressure after having been charged during an initial time interval, and $P_d$ is the desired tire or pressure container pressure value; and, means for calculating a pressure discharge relationship utilizing the following formula $$T_d = -2\frac{\Delta T_i}{\Delta p_i}\left((p_0 - p_a)^{\frac{1}{2}} - (p_d - p_a)^{\frac{1}{2}}\right)(p_i - p_a)^{\frac{1}{2}}$$

where, $T_d$ is the time required to discharge the tire or pressure container to the desired pressure, $\Delta T_i$ is an initial discharge time interval, $p_0$ is the tire or pressure container pressure before initiating a pressure discharge;

$\Delta p_i$ is a pressure difference between the tire or pressure container pressure after initiating an initial pressure discharge and the tire or pressure container pressure before the pressure discharge begins, $p_a$ is the atmospheric pressure or discharge return tank pressure, $p_i$ is the tire or pressure container pressure after having been discharged during an initial time interval, and $p_d$ is the desired tire or pressure container pressure value.

* * * * *